*INVENTORS*
Oskar E. Peters
Ernst Kreissig

United States Patent Office 2,747,428
Patented May 29, 1956

2,747,428

COMPOSITE CRANKSHAFT

Oskar E. Peter, Oberkochen, Wurttemberg, and Ernst Kreissig, Krefeld-Uerdingen, Germany Application April 24, 1951, Serial No. 222,686

Claims priority, application Germany April 27, 1950

2 Claims. (Cl. 74—598)

This invention relates to composite crankshafts and the like.

A conventional form of composite crankshaft has toothed connections between a hollow crankpin and the crank arms connected by the crankpin, and also between the crank arms and the shafts joined by the crank arms and crankpin, and has a bolt through the hollow center of the crankpin to hold the crank arms and crankpin tightly together. The normally large and rapidly fluctuating load on the crankshaft tends to loosen these connections after use, the concentration of load on the bolt threads results in a relatively heavy structure, and precision work and high quality machine tools are necessary to produce such a conventional composite crankshaft.

Our invention provides a means and method of connection which transmits considerable bending and torsional forces in crankshafts and the like, is capable of manufacture from known components, and can be protected against overloads. In a preferred embodiment of the invention ring springs are inserted in spaces between the crankpin and crank arms of a crankshaft, and axial compression of the ring springs causes them to fill the spaces between the crankpin and crank arms and thereby securely fasten them together. The elastic compression between the ring springs, crankpin and crank arms also tends to counteract the forces developed during operation of a composite crankshaft constructed in accordance with the invention.

Other objects, features and advantages of the invention will become apparent as the following detailed description of a specific embodiment of the invention proceeds.

Figure 1:
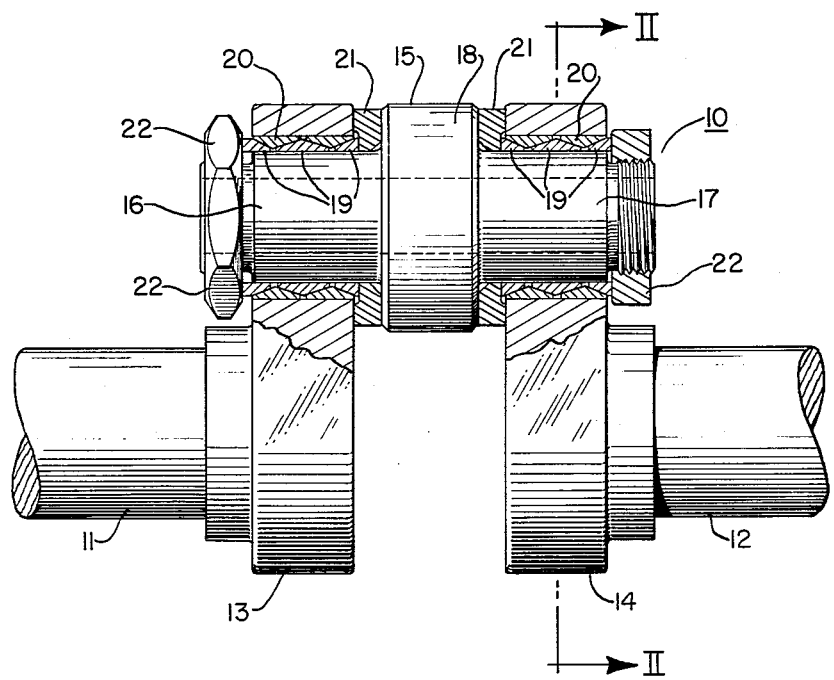
Figure 2:
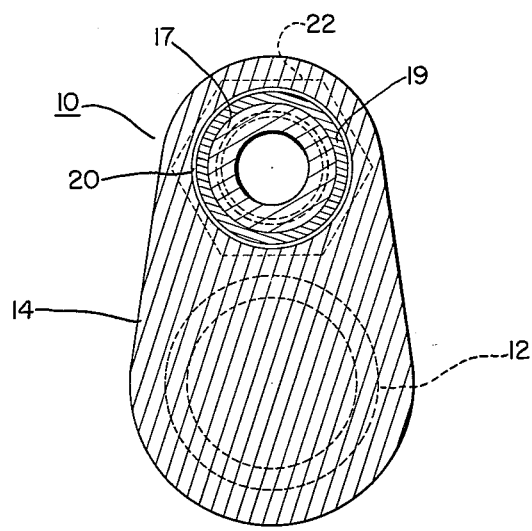

In the accompanying drawings:

Figure 1 is a partially sectioned side elevation of a portion of a crankshaft embodying the invention; and Figure 2 is a section on the line II—II in Figure 1.

Referring now more specifically to the drawings, a crankshaft 10 has a pair of spaced coaxial shaft elements 11 and 12 respectively mounting a pair of spaced integral crank arms 13 and 14. A crankpin 15 has cylindrical ends 16 and 17 extending through larger diameter axially-extending openings in the projecting ends of the respective crank arms 13 and 14. An integral collar 18 extends around the middle portion of the pin 15.

The pin end 16 is secured to the crank arm 13 by inner ring springs 19 and outer ring springs 20. These respective groups of springs have interengaging conical surfaces which radially wedge the inner springs 19 inwardly and the outer springs 20 outwardly when the two groups of springs are axially compressed. The inner springs 19 have a sufficiently large inner diameter and the outer springs 20 have a sufficiently small inner diameter to permit these springs to be slipped between the pin end 16 and the corresponding opening in the crank arm 13 before the springs 19 and 20 are axially compressed. A washer 21 is interposed between the crank arm 13 and pin collar 18, and a nut 22 screwed on the extremity of the pin end 16 axially compresses the inner rings 19 between the nut 22 and a portion of the washer 21. The inner rings 19 are spaced substantially apart from each other axially, and the outer rings are likewise spaced apart from each other axially, before the nut 22 is tightened against them. As the nut 22 is screwed toward the collar 18 the rings 19 and 20 are pressed together axially and are wedged radially against each other and against the crank arm 13 and pin end 16 until they fill the space between the crank arm 13 and pin end 16 (the axial spacing between the adjacent rings diminishes to a negligible amount when the rings are fully compressed). Further tightening of the nut 22 increases the compression so that the connection between the crank arm 13 and pin end 16 is equivalent to an integral solid connection, and the compression forces exceed the forces expected to be developed during operation of the crankshaft 10.

The other pin end 17 and crank arm 14 are similarly connected. The resultant connections are capable of withstanding all anticipated forces and yet are relatively inexpensive to manufacture. The separate parts of the crankshaft can be made as simple forgings and can be finished on ordinary machine tools. The ring springs are simple turned pieces which are readily manufactured with precision. The crankpin is preferably hollow to increase its diameter for improved strength and better connections with the crank arms without a corresponding increase of weight. The ring springs can be split but are preferably fully circular for improved strength of connection. By regulation of axial compression on the ring springs the frictional grip of the ring springs may be adjusted so that overloads may overcome the frictional grip to avoid breakage.

While we have shown and described a present preferred embodiment of the invention and have illustrated a present preferred method of practicing the same it will be recognized that changes in the details and arrangements may be made without departing from the spirit of the invention or the scope of the following claims.

We claim:

1. A composite crankshaft built up of elements which are assembled with variable clamping forces and which can be disassembled again, comprising a pair of parallel shaft elements having opposite ends spaced apart axially, a pair of arms secured to said ends and extending transversely therefrom, said arms having concentric bores through their projecting ends, a pin having opposite ends extending in spaced relation through said bores, ring springs in the annular spaces between said arm bores and pin ends, the set of ring springs between each pin end and arm bore comprising a plurality of outer ring springs each slidable along the bore when relaxed and clampable against the bore when radially expanded, and a plurality of inner ring springs each slidable along the pin end when relaxed and clampable against the pin end when radially contracted, the adjacent inner and outer rings having conical interengaging surfaces for wedging the rings radially when they are compressed axially, a nut threaded around the outside of the outer end of each pin end for pressing axially against an adjacent ring spring, the nut being rotatable without rotating said adjacent ring spring, and means extending around the pin and having annular opposite sides each rigidly engaging a side of one of the arms and a side of the nearest ring spring in the bore of said arm, thereby serving to space the arms and to restrain the said nearest rings against axial movement toward the middle of the pin when the nuts are advanced toward each other to wedge the respective sets of rings into solid clamping engagement with each other and adjacent arm bores and pin ends.

2. A composite crankshaft built up of elements which are assembled with variable locking forces and which can readily be disassembled again, comprising a pair of parallel shaft elements having opposite ends spaced apart axially, a pair of arms secured to said ends and extending transversely therefrom, said arms having concentric cylindrical bores of equal diameter through their projecting ends, a pin having cylindrical opposite ends of equal diameter and an opening extending axially through the entire length of the pin, interchangeable sets of ring springs in the annular spaces between said arm bores and pin ends, each ring consisting of an unbroken circle of spring metal, the set of ring springs between each pin end and arm bore comprising a plurality of outer ring springs each slidable along the bore when relaxed and clampable against the bore when radially expanded, and a plurality of inner ring springs each slidable along the pin end when relaxed and clampable against the pin end when radially contracted, the adjacent inner and outer rings having conical interengaging surfaces for wedging the rings radially when they are compressed axially, a nut threaded around the outside of the outer end of each pin end for pressing axially against an adjacent ring spring, and means extending around the pin and having annular opposite sides each rigidly engaging a side of one of the two arms and a side of the nearest ring spring in the bore of said arm, thereby serving to space the arms and to restrain the said nearest rings against axial movement toward the middle of the pin when the nuts are advanced toward each other to wedge the respective sets of rings into solid clamping engagement with each other and the adjacent arm bores and pin ends.

References Cited in the file of this patent

UNITED STATES PATENTS

| 189,190 | Chapman | Apr. 3, 1877 |
|---|---|---|
| 572,497 | Bragg | Dec. 1, 1896 |
| 1,136,524 | Hartig | Apr. 20, 1915 |
| 1,514,768 | Hirth | Nov. 11, 1924 |
| 2,190,411 | Mattison | Feb. 13, 1940 |
| 2,364,109 | Taylor | Dec. 5, 1944 |
| 2,410,785 | Hood | Nov. 5, 1946 |
| 2,485,009 | Muller | Oct. 18, 1949 |
| 2,528,309 | Hood | Oct. 31, 1950 |
| 2,573,928 | Peter | Nov. 6, 1951 |

FOREIGN PATENTS

| 850,824 | France | Dec. 27, 1939 |